United States Patent
Lubin et al.

(10) Patent No.: US 7,769,199 B2
(45) Date of Patent: Aug. 3, 2010

(54) METHOD AND APPARATUS FOR PROVIDING REDUCED REFERENCE TECHNIQUES FOR LOW FREQUENCY WATERMARKING

(76) Inventors: Jeffrey Lubin, 3 Wallingford Dr., Princeton, NJ (US) 08540; Hui Cheng, 80 Shields La., Bridgewater, NJ (US) 08807

( * ) Notice: Subject to any disclaimer, the term of this patent is extended or adjusted under 35 U.S.C. 154(b) by 1659 days.

(21) Appl. No.: 10/872,963

(22) Filed: Jun. 21, 2004

(65) Prior Publication Data
US 2005/0018875 A1 Jan. 27, 2005

Related U.S. Application Data
(60) Provisional application No. 60/479,816, filed on Jun. 19, 2003.

(51) Int. Cl.
*G06K 9/00* (2006.01)
(52) U.S. Cl. ............ 382/100; 283/113; 358/3.28; 713/176
(58) Field of Classification Search .......... 382/100; 358/3.28; 283/113; 713/176
See application file for complete search history.

(56) References Cited

U.S. PATENT DOCUMENTS

| | | | |
|---|---|---|---|
| 6,683,966 B1 * | 1/2004 | Tian et al. ............ | 382/100 |
| 7,006,630 B2 * | 2/2006 | Yu et al. ............ | 380/201 |
| 7,418,110 B2 * | 8/2008 | Lubin et al. ............ | 382/100 |
| 2002/0054692 A1 * | 5/2002 | Suzuki et al. ............ | 382/100 |
| 2003/0021439 A1 * | 1/2003 | Lubin et al. ............ | 382/100 |
| 2003/0188166 A1 | 10/2003 | Pelly et al. | |
| 2004/0066951 A1 | 4/2004 | Pelly et al. | |

OTHER PUBLICATIONS

P. Nguyen et al., "Registration Methods for Non Blind Watermark Detection in Digital Cinema Applications," SPIE, vol. 5020, pp. 553-561 (2003).
J. Lubin et al., "Robust, Content-Dependent, High-Fidelity Watermark for Tracking in Digital Cinema," SPIE, vol. 5020, pp. 536-545 (2003).
P. Nguyen, R. Baiter, N. Montfort, S. Baudry, "Registration Methods for Non Blind Watermark Detection in Digital Cinema Applications" SPIE vol. 5020 (Jan. 2003). pp. 553-561.
J. Lubin, J. A. Bloom, H. Cheng, "Robust, Content Dependent, High-Fidelity Watermark for Tracking in Digital Cinema", SPIE vol. 5020 (Jan. 2003), pp. 536-545.
International Search Report, PCT Pat. App. No. PCT/US2004/019864, published Sep. 15, 2005.

* cited by examiner

*Primary Examiner*—Bhavesh M Mehta
*Assistant Examiner*—Stephen R Koziol
(74) *Attorney, Agent, or Firm*—McDonnell Boehnen Hulbert & Berghoff LLP

(57) ABSTRACT

A method and apparatus for using a reference in a watermarking application is disclosed. Watermarked content and a reduced resolution reference are registered such that registration parameters are calculated. The watermarked content is processed using the registration parameters. A watermark is recovered using the processed watermarked content and the reduced resolution reference.

20 Claims, 3 Drawing Sheets

METHOD AND APPARATUS FOR PROVIDING REDUCED REFERENCE TECHNIQUES FOR LOW FREQUENCY WATERMARKING

CROSS-REFERENCE TO RELATED APPLICATIONS

This application claims benefit of U.S. provisional patent application Ser. No. 60/479,816, filed Jun. 19, 2003, which is herein incorporated by reference.

BACKGROUND OF THE INVENTION

In informed (reference-based) watermark detection, the reference is typically a full resolution copy of the watermarked content, without any of the watermarks to be detected. Use of this high quality reference, especially for detection while outside a trusted environment, constitutes a potential security concern. A potential storage problem could exist as well since large numbers of different high quality movies may need to be stored on the laptop of a field agent.

Therefore, there is a need in the art to provide a reduced resolution reference to detect low frequency watermarks.

SUMMARY OF THE INVENTION

The present invention generally discloses a method and apparatus for using a reference in a watermarking application. In one embodiment, watermarked content and a reduced resolution reference are registered such that registration parameters are calculated. The watermarked content is processed using the registration parameters. A watermark is recovered using the processed watermarked content and the reduced resolution reference.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
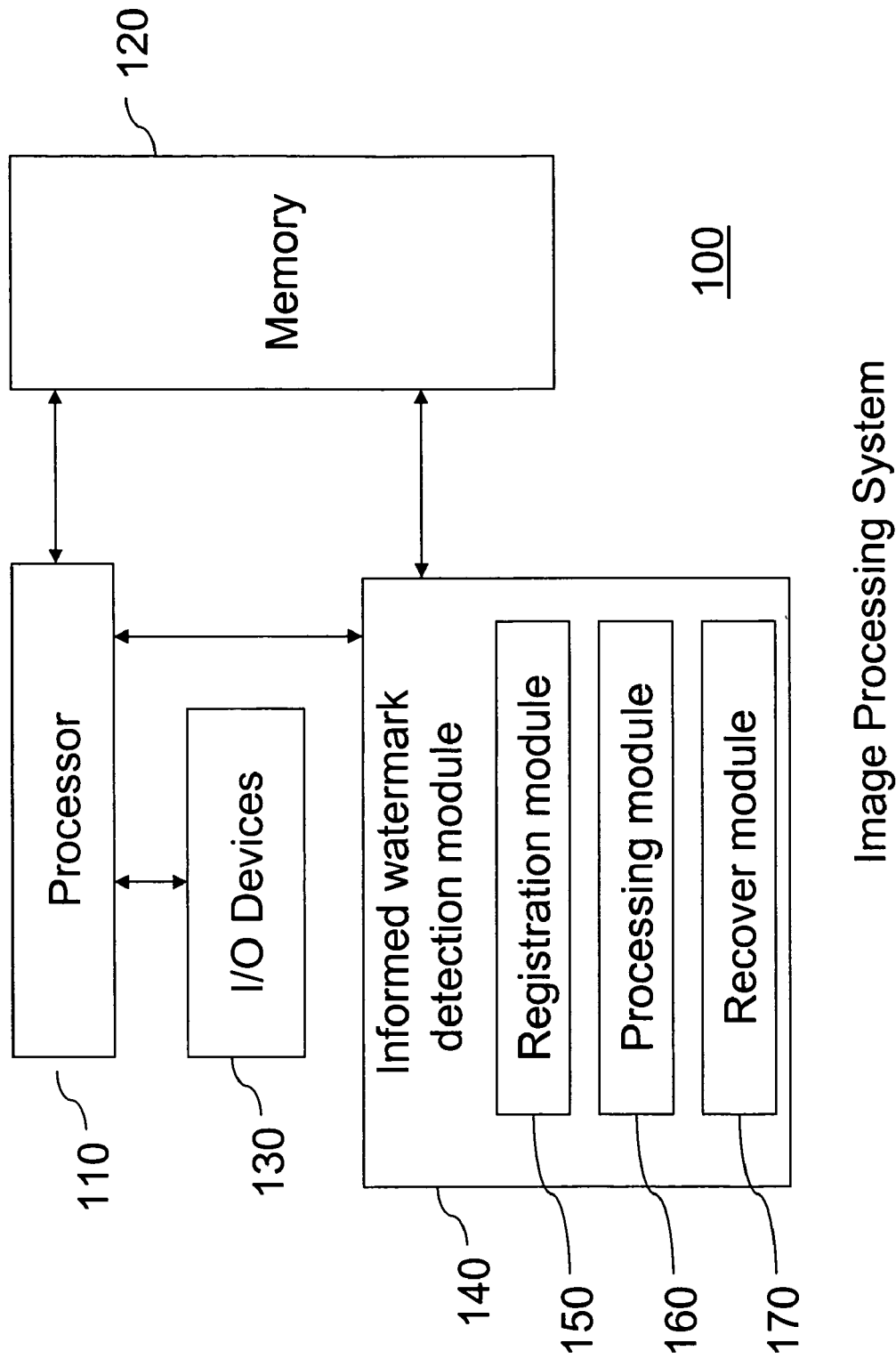
FIG. 1 illustrates a system in accordance with one embodiment of the present invention.

FIG. 1 illustrates a block diagram of an image processing device or system 100 of the present invention. Specifically, the system can be employed to process an content to detect a watermark. In one embodiment, the image processing device or system 100 is implemented using a general purpose computer or any other hardware equivalents.

Thus, image processing device or system 100 comprises a processor (CPU) 110, a memory 120, e.g., random access memory (RAM) and/or read only memory (ROM), informed watermark detection module 140, and various input/output devices 130, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the informed watermark detection module 140 can be implemented as one or more physical devices that are coupled to the CPU 110 through a communication channel. Alternatively, the informed watermark detection module 140 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 120 of the computer. As such, the informed watermark detection module 140 (including associated data structures) of the present invention can be stored on a computer readable medium, e.g., RAM memory, magnetic or optical drive or diskette and the like.

The present invention discloses a method and apparatus that uses a reduced resolution reference for informed detection of a low frequency watermark. A reduction in the resolution of the reference may be accomplished by down-sampling, however, other methods to reduce resolution of the reference can also be used, instead of, or in addition to simple down-sampling.

In one embodiment, a full or reduced resolution reference can be stored in a relatively low bit-rate (i.e., poor visual quality) compressed format (e.g., MPEG-2), and then decoded as needed. If desired, compression parameters can be adjusted to help ensure fidelity at the low frequencies. Low-pass filtering of the reference can be used to condition the reference before entering the registration process as illustrated in FIG. 2.

In another embodiment, high frequency noise or other artifacts can be intentionally injected into the reference before distribution to field agents, in order to lessen the "street value" of the reference itself. These high frequency artifacts can then be removed with low-pass filtering before the reference is used in the registration process.

In another embodiment, a full or reduced resolution reference can be stored in a relatively low bit-rate compressed format, and then decoded as needed in addition to having high frequency noise or other artifacts injected into the reference. In this embodiment, low-pass filtering would also be used to condition and remove the high frequency noise or artifacts before using the reference in the registration process.

Figure 2:
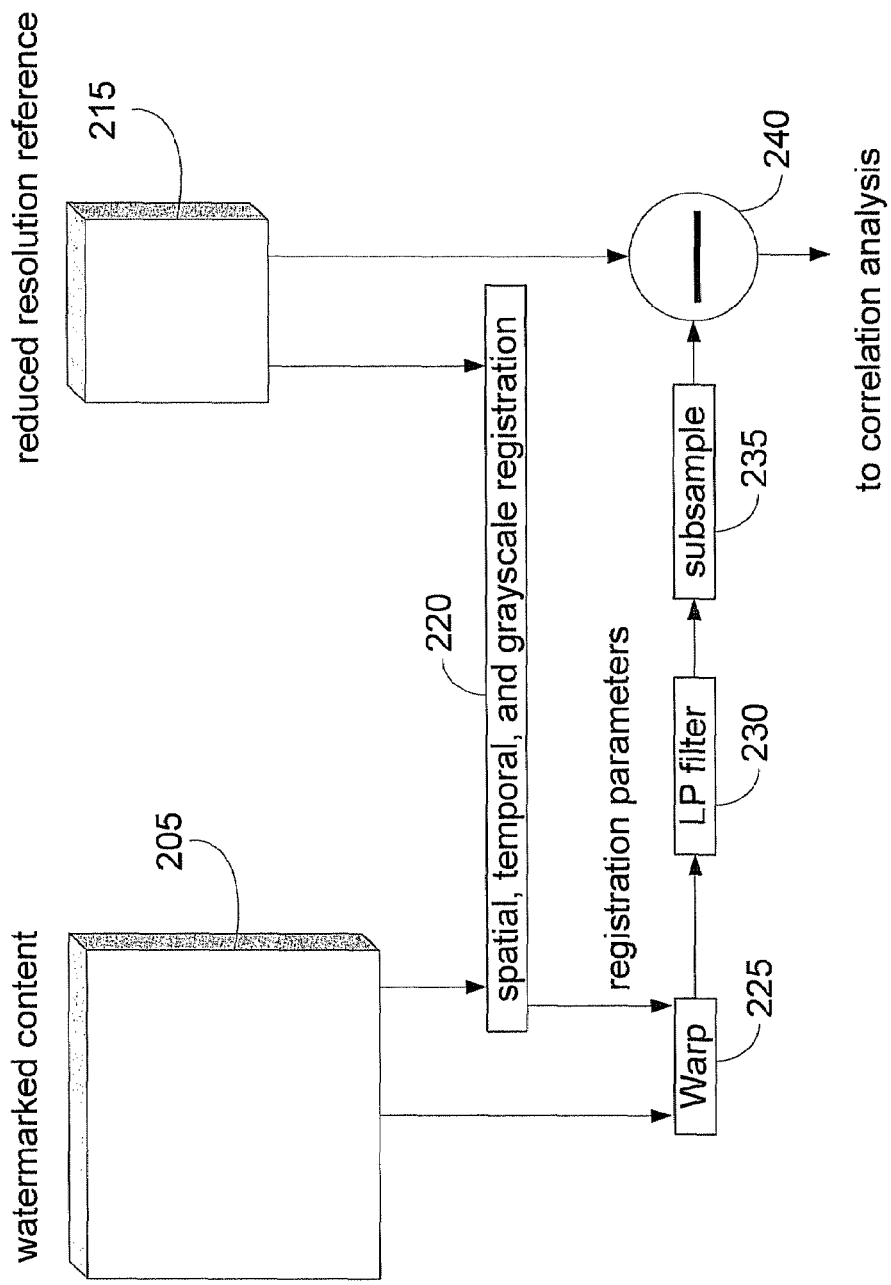
FIG. 2 illustrates a system in accordance with one embodiment of the present invention.

FIG. 2 illustrates one embodiment of the present invention. Registration of watermarked content 205 and a reduced resolution reference 215 is performed using registration module 150, 220. Alignment or registration parameters are calculated by registration module 150, 220 and then used to warp the full resolution watermarked content 205 using warping module 225. The watermarked content 205 is then filtered and subsampled using low-pass filter 230 and subsampler 235 in preparation for differencing by subtractor 240 and correlation analysis to recover the watermark bit stream. It should be understood that warping module 225, low-pass filter 230, and subsampler 235 may be implemented in processing module 160. Differencing and correlation analysis may be implemented in recovery module 170. In one embodiment, other features (e.g., corners, edges) in original high resolution coordinates may be compiled in feature lists 110 and may be optionally used to anchor and improve the registration, if desired.

Figure 3:
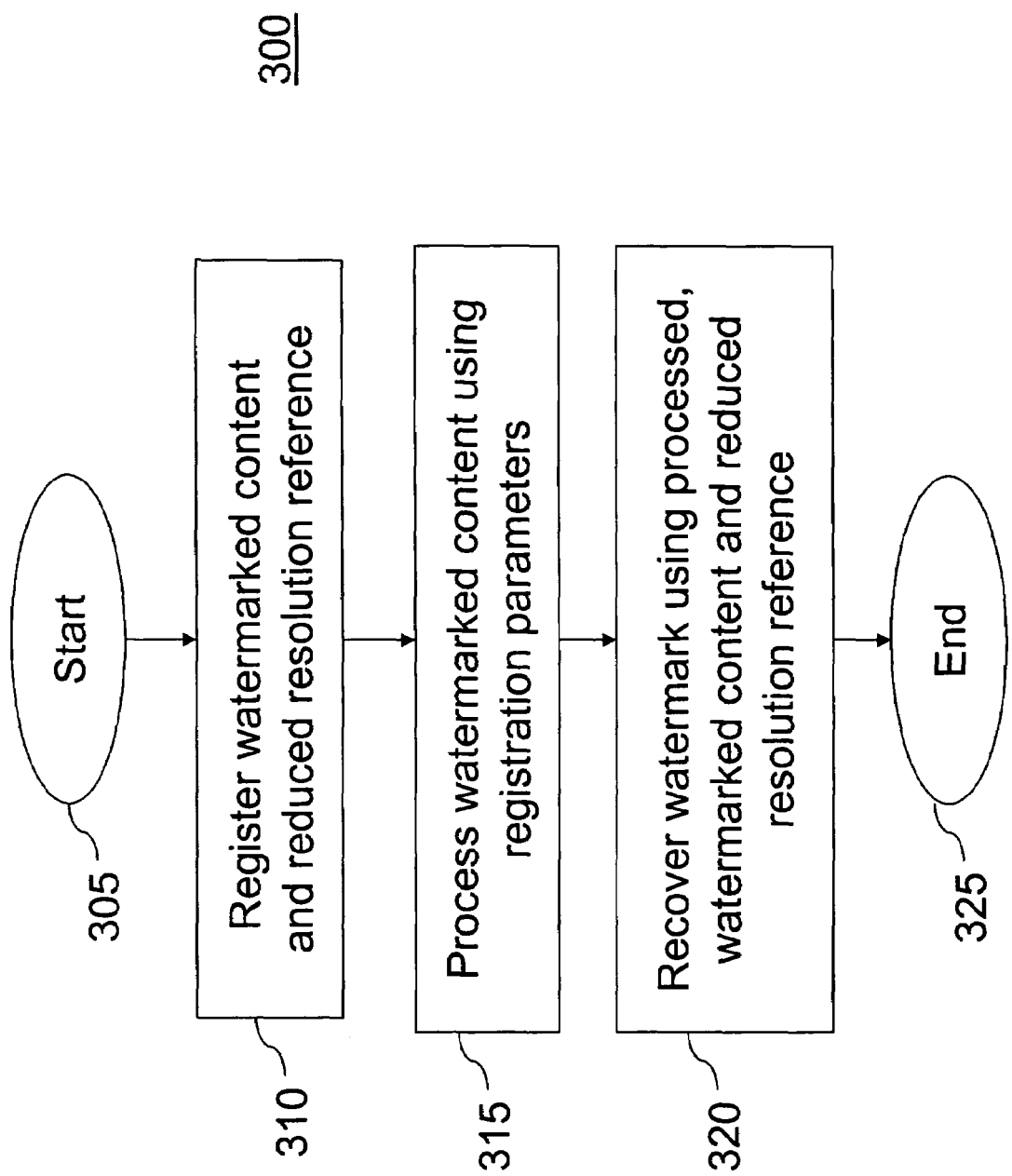
FIG. 3 illustrates a flow diagram in accordance with a method of the present invention.

FIG. 3 illustrates a diagram in accordance with a method 300 of the present invention. Method 300 starts in step 305 and proceeds to step 310.

In step 310, watermarked content and a reduced resolution reference are registered. The watermarked content usually has a higher spatial resolution than the reference. Temporal and grayscale resolution of the watermarked content may be higher than the reference as well. Thus, registration module 150, 220 may perform spatial, temporal, and grayscale registration of the watermarked content and the reduced resolution reference. Registration module 150, 220 computes warping parameters such that the downstream differences are minimized (except at the watermark frequencies) between the reduced resolution reference and the warped, low-pass filtered and downsampled version of the content.

Numerous methods for registering the watermarked content and the reduced resolution reference may be utilized. For example, in one embodiment, a spatial, temporal, histogram (STH) registration may be utilized. In this embodiment, a minimization of the objective function (i.e., the difference between the registered content and the reference) occurs not only after registration, but also after a subsequent low-pass filtering and down-sampling process as well.

Registration using reduced reference instead of the original reference may at times reduce the accuracy and robustness of the STH registration. To further improve the accuracy and robustness of video registration in the reduced resolution, lists of features 210 and their original resolution coordinates, as previously extracted from the original resolution source, can be saved together with the reduced reference. In the registration process 210, the same feature extraction algorithm is then used to extract features from the watermarked image 205. The registration algorithm will not only match the pixel values between the watermarked video and the reduce reference, but also match the features extracted from the two sequences. Some of the features that will improve the registration are edge maps in high resolution and corner maps or locations in high resolution.

In step 315, the watermarked content is processed using the registration parameters generated by registration step 310. The watermarked content 205 is then filtered and subsampled using low-pass filter 230 and subsampler 235.

In step 320, the watermark is recovered using the processed, watermarked content from processing step 315 and the reduced resolution reference 215. This is accomplished by differencing the processed, watermarked content and the reduced resolution reference, and by performing a correlation analysis. Method 300 ends in step 325.

While the foregoing is directed to embodiments of the present invention, other and further embodiments of the invention may be devised without departing from the basic scope thereof, and the scope thereof is determined by the claims that follow.

The invention claimed is:

1. A method of processing images using a reference in a watermarking application, comprising:
   receiving a distributed reference at an image processing device, wherein the distributed reference has a reduced resolution, and wherein the distributed reference does not include a watermark;
   registering watermarked content at the image processing device and the reduced resolution reference such that registration parameters are calculated;
   warping the watermarked content at the image processing device using the registration parameters;
   processing the watermarked content at the image processing device using the registration parameters; and
   recovering a watermark at the image processing device using both the processed watermarked content and the reduced resolution reference.

2. The method of claim 1, wherein processing the watermarked content further comprises low pass filtering the watermarked content.

3. The method of claim 2, wherein processing the watermarked content further comprises subsampling the watermarked content.

4. The method of claim 1, wherein registering the watermarked content comprises performing a spatial, temporal, histogram (STH) registration.

5. The method of claim 4, wherein processing the watermarked content further comprises:
   warping the watermarked content using spatial, temporal, histogram registration parameters;
   low pass filtering the watermarked content; and
   subsampling the watermarked content.

6. The method of claim 1, wherein receiving the distributed reference comprises receiving a downsampled reference.

7. The method of claim 1, wherein receiving the distributed reference comprises receiving a low bit-rate compressed reference, with low-pass filtering.

8. The method of claim 1, wherein receiving the distributed reference comprises receiving an intentionally marred reference, with low pass filtering.

9. The method of claim 1, wherein receiving the distributed reference comprises receiving an intentionally marred, low bit-rate compressed reference, with low pass filtering.

10. The method of claim 1, further comprising using an extracted feature list to improve registration.

11. The method of claim 10, wherein registering the watermarked content includes extracting features from the watermarked content; and
   matching the features extracted from the watermarked content with features of the reduced resolution reference.

12. A computer-readable medium having stored thereon a plurality of instructions, the plurality of instructions including instructions which, in response to being executed by an image processing device, cause the image processing device to perform a method of using a reference in a watermarking application, comprising:
   receiving a distributed reference, wherein the distributed reference has a reduced resolution, and wherein the distributed reference does not include a watermark;
   registering watermarked content and the reduced resolution reference such that registration parameters are calculated;
   warping the watermarked content using the registration parameters;
   processing the watermarked content using the registration parameters; and
   recovering a watermark using both the processed watermarked content and the reduced resolution reference.

13. An apparatus for using a reference in a watermarking application, comprising:
   means for receiving a distributed reference, wherein the distributed reference has a reduced resolution, and wherein the distributed reference does not include a watermark;
   means for registering watermarked content and the reduced resolution reference such that registration parameters are calculated;
   means for warping the watermarked content using the registration parameters;
   means for processing the watermarked content using the registration parameters; and means for recovering a watermark using the processed watermarked content and the reduced resolution reference.

14. The method of claim 2, wherein receiving the distributed reference includes receiving a distributed reference that has been injected with high-frequency artifacts before distribution.

15. The method of claim 14, wherein the low pass filtering includes removing the injected high-frequency artifacts.

16. The computer-readable medium of claim 12, wherein receiving the distributed reference includes receiving a distributed reference that has been injected with high-frequency noise before distribution.

17. The apparatus of claim 13, wherein the means for receiving the distributed reference are configured to receive a distributed reference that has been injected with high-frequency noise before distribution.

18. The apparatus of claim 17, further comprising:
means for filtering the distributed reference.

19. The apparatus of claim 18, wherein the means for filtering the distributed reference are configured to remove the injected high-frequency noise.

20. The apparatus of claim 19, wherein the means for filtering are a low pass filter.

* * * * *